(12) United States Patent
Loftus et al.

(10) Patent No.: US 7,083,383 B2
(45) Date of Patent: Aug. 1, 2006

(54) SEGMENTED ROTOR BLADE TRIM TAB

(75) Inventors: Robert T. Loftus, Gilbert, AZ (US); Michael J. McNulty, Scottsdale, AZ (US); Keith B. Smith, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 10/832,149

(22) Filed: Apr. 26, 2004

(65) Prior Publication Data

US 2005/0238482 A1    Oct. 27, 2005

(51) Int. Cl.
*B64C 27/467*    (2006.01)
*F04D 29/38*    (2006.01)

(52) U.S. Cl. .............................. 416/132 R; 416/223 R

(58) Field of Classification Search ................ 415/148, 415/119; 416/62, 223 R, 23, 24, 500, 132 R, 416/132 A See application file for complete search history.

(56) References Cited

U.S. PATENT DOCUMENTS

| 2,760,588 A | * | 8/1956 | Zeerip ..................... 416/241 R |
| 4,188,171 A | * | 2/1980 | Baskin ....................... 416/226 |
| 2004/0253108 A1 | * | 12/2004 | Schmaling et al. ...... 416/132 A |

* cited by examiner

*Primary Examiner*—Edward K. Look
*Assistant Examiner*—Richard A. Edgar
(74) *Attorney, Agent, or Firm*—Thompson Coburn LLP

(57) ABSTRACT

A trim tab assembly for a helicopter rotor blade includes a plurality of metal panels that are secured to the trailing edge of a composite material helicopter blade. Each of the metal panels can be bent relative to the rotor blade to tune the aerodynamic properties of the rotor blade.

28 Claims, 3 Drawing Sheets

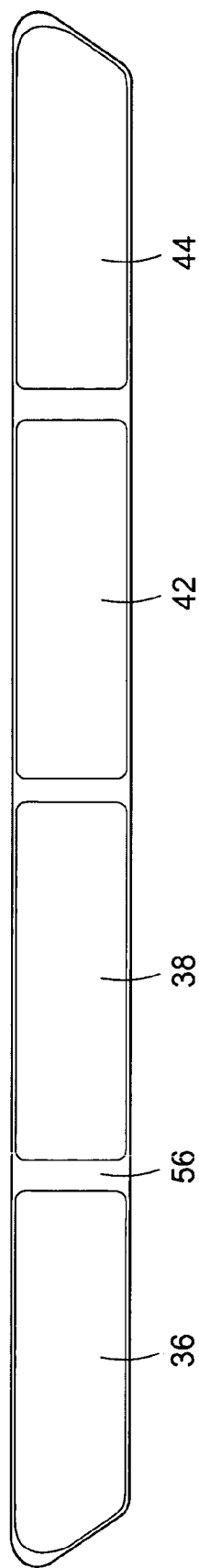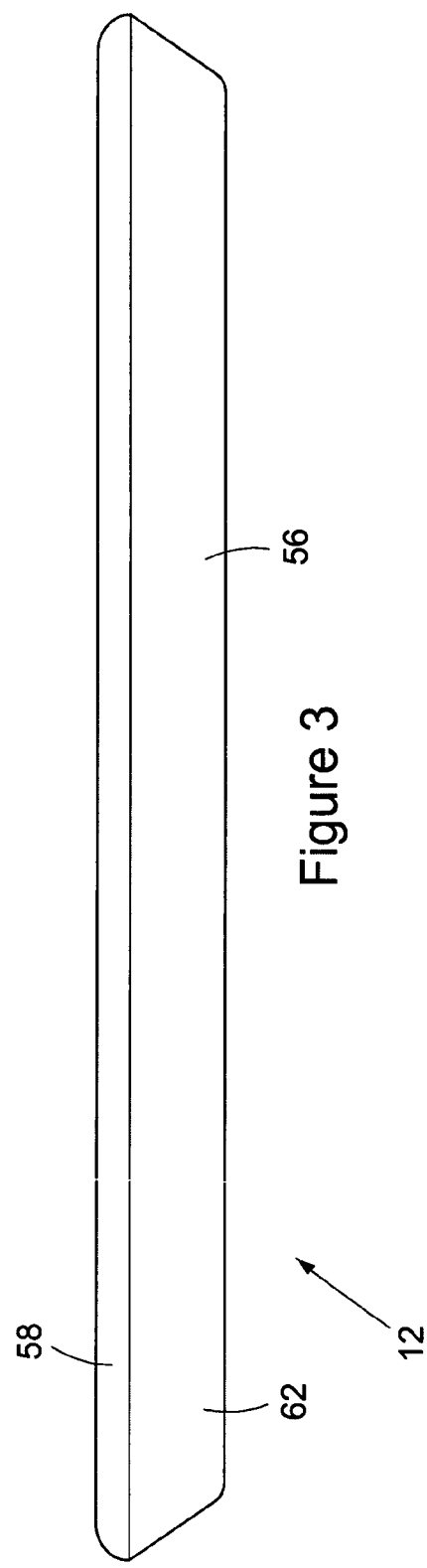
Figure 2
Figure 3

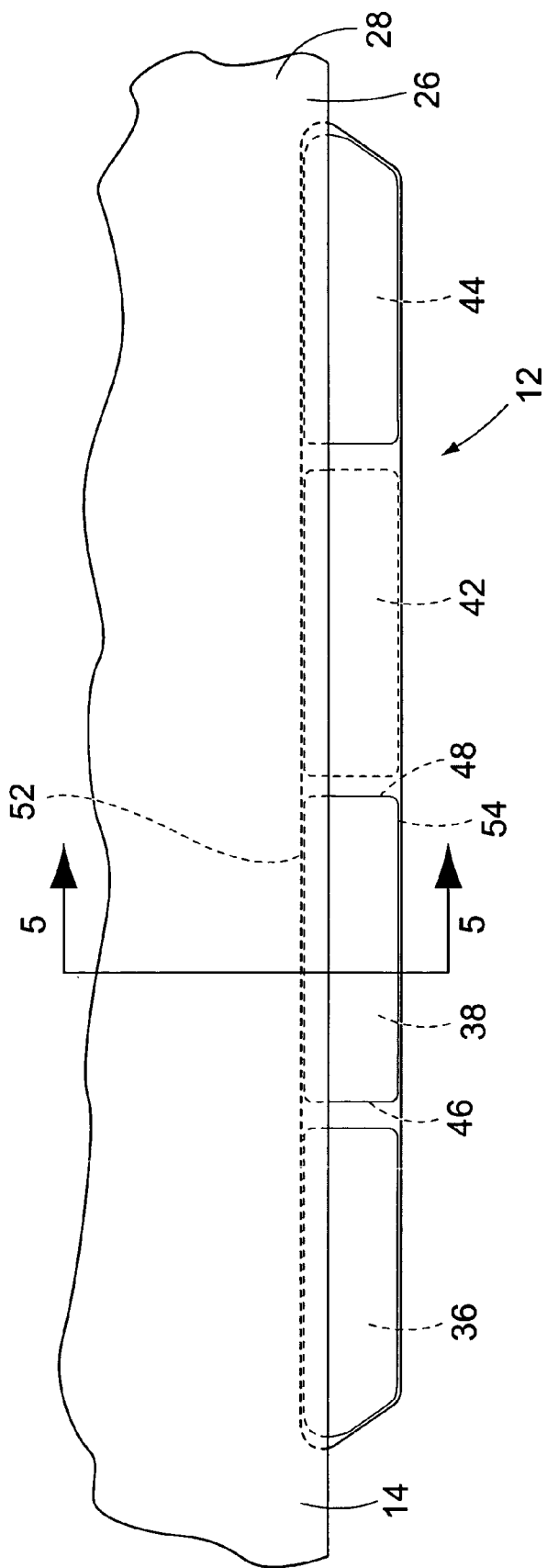
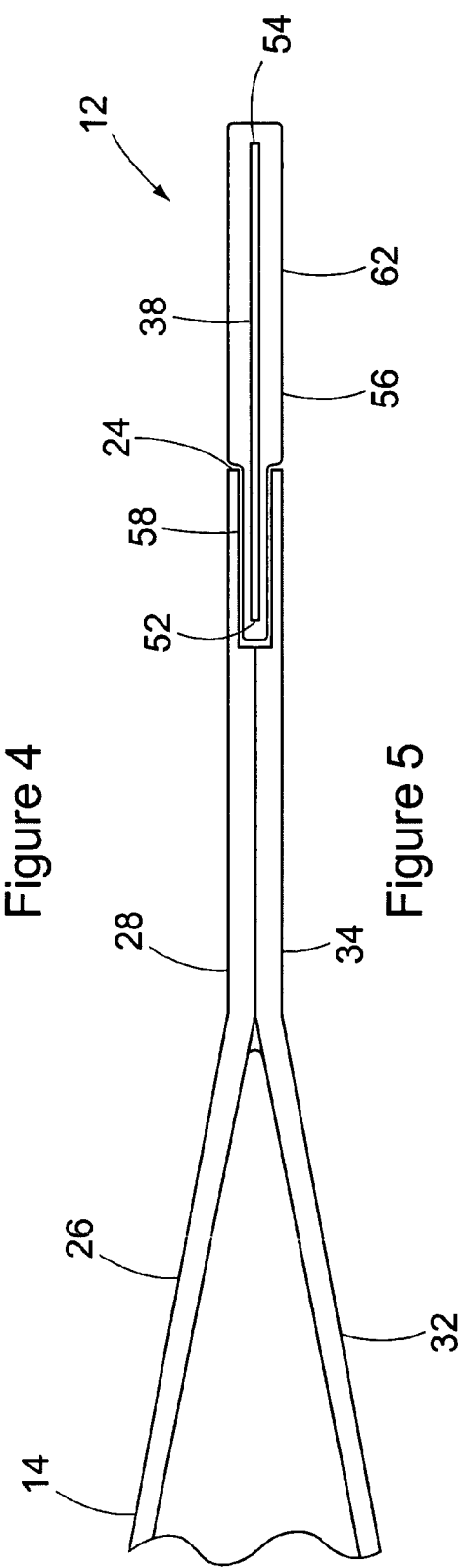
Figure 4
Figure 5

SEGMENTED ROTOR BLADE TRIM TAB

This invention was developed in the course of work under U.S. Government Army Contract DAAB07-97-9-J046. The U.S. government may possess certain rights in the invention.

BACKGROUND OF THE INVENTION (1) Field of the Invention

The present invention pertains to a segmented rotor blade trim tab for a rotary wing aircraft. Specifically, the present invention pertains to a trim tab for a helicopter rotor blade, where the trim tab is comprised of a plurality of metal elements that are secured to the trailing edge of a composite material helicopter blade. Each of the metal elements can be bent relative to the rotor blade to tune the aerodynamic properties of the rotor blade.

(2) Description of the Related Art

For rotary wing aircraft, for example helicopters, it is necessary that the plurality of rotor blades of the aircraft rotate or fly in the same plane to minimize aircraft vibration. Rotation of the helicopter rotor blades in the same plane can be achieved by adding trim tabs to the trailing edge of each rotor blade. The trim tabs of each rotor blade can be moved upwardly or downwardly to respectively lower or raise the rotor blade toward the desired plane of rotation of the rotor blades. In this manner, the trim tabs are used to tune the aerodynamic properties of each individual rotor blade.

In order to function properly, the trim tabs of the rotor blades must be able to hold a permanent set (i.e., maintain their adjusted position relative to the rotor blade), provide an acceptable aerodynamic surface, and survive the high-strain environment found at the trailing edge of a rotor blade.

SUMMARY OF THE INVENTION

In designing trim tabs for modern aircraft rotor blades that are constructed of composite materials, it is difficult to find a suitable material for the trim tab. Trim tabs constructed of metal are well-suited for holding a permanent set or orientation relative to the rotor blade and, when formed as a flat panel, provide a good aerodynamic surface. However, metal trim tabs could not survive the high-strain environment at the trailing edge of the modern composite rotor blades. Composite materials, which could meet the high-strain requirements of the modern rotor blade trailing edge, are not well-suited for holding a permanent set or orientation relative to the rotor blade.

The segmented trim tab assembly of the present invention overcomes these disadvantages. The segmented trim tab assembly is designed for use with a rotor blade constructed of composite materials. Composite material rotor blades are typically constructed of several layers of composite material, with the layers of material extending along the longitudinal length of the rotor blade and across the lateral width of the rotor blade. One or more layers of the composite materials are sandwiched between an upper layer of the material at the top surface of the rotor blade and a lower layer of the material at the bottom surface of the rotor blade.

The segmented trim tab assembly of the invention is secured to the trailing edge of the rotor blade projecting outwardly from the trailing edge. The segmented trim tab assembly is constructed of one or more metallic trim tab panels that are encapsulated in a flexible material and secured to the rotor blade trailing edge.

Each of the trim tabs is constructed as a rigid panel having a longitudinal length and laterally opposite forward and rearward edges. The trim tab panel is encapsulated in a flexible material, for example a rubber material. The forward edge of the trim tab is secured to the rotor blade trailing edge by being sandwiched between the upper layer and lower layer of the composite material of the rotor blade. This secures the trim tab forward edge to the rotor blade with the trim tab projecting laterally outwardly from the rotor blade trailing edge to the trim tab rearward edge.

The metal of the trim tab is capable of being bent relative to the rotor blade. This enables the trim tab to be moved to an upwardly extending position relative to the rotor blade, or a downwardly extending position relative to the rotor blade. Movement of the trim tabs to set positions projecting upwardly or downwardly relative to the rotor blade tunes the aerodynamic properties of the rotor blade, whereby each of the aircraft's rotor blades can be tuned so that the blades rotate or fly in approximately the same plane, thereby minimizing aircraft vibration.

BRIEF DESCRIPTION OF THE DRAWINGS

FIG. 2 is a plan view of a portion of the segmented trim tab assembly of the invention;

FIG. 3 is a plan view of the segmented trim tab assembly;

FIG. 4 is a plan view of the segmented trim tab assembly secured to a rotor blade; and, FIG. 5 is a cross-section of the segmented trim tab assembly and rotor blade of FIG. 4 taken along the line 5—5 of FIG. 4.

DETAILED DESCRIPTION OF THE PREFERRED EMBODIMENTS

Figure 1:
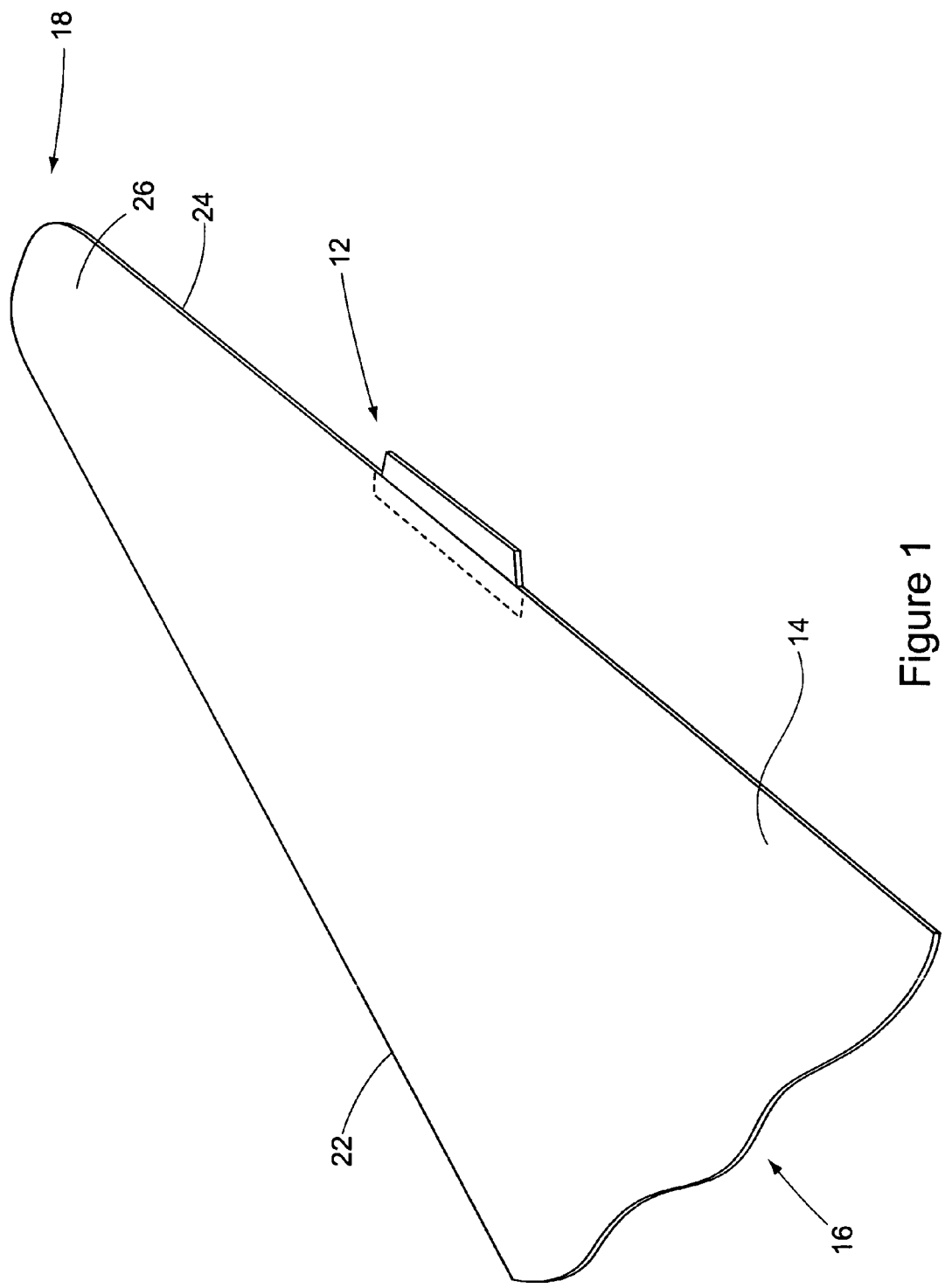
FIG. 1 is a partial prospective view of an aircraft rotor blade incorporating the segmented trim tab assembly of the invention.

FIG. 1 shows the segmented trim tab assembly 12 of the present invention secured to the trailing edge of a aircraft rotor blade 14. In the description of the invention to follow, the segmented trim tab assembly 12 is described as being attached to a composite material rotor blade 14 of a helicopter. However, it should be understood that the segmented trim tab assembly 12 of the invention may be employed in other operative environments, and the environment of the helicopter rotor blade 14 used herein is illustrative only and should not be interpreted as limiting.

The rotor blade 14 has a longitudinal length with opposite proximal 16 and distal 18 ends, and a lateral width between a leading edge 22 and a trailing edge 24 of the rotor blade. The leading edge 22 is the forward edge of the rotor blade that moves ahead of the trailing edge 24 during rotation of the rotor blade.

The rotor blade 14 is constructed of composite materials, known in the art. In the preferred embodiment the rotor blade 14 is constructed of a plurality of layers of composite material, including at least an upper layer 26 that defines the top surface 28 of the rotor blade, and a lower layer 32 that defines the bottom surface 34 of the rotor blade. As best seen in figure 5, as the rotor blade upper layer 26 and lower layer 32 extend away from the rotor blade leading edge 22 toward the rotor blade trailing edge 24, the two layers merge or taper toward each other. Adjacent the rotor blade trailing edge 24 the two layers 26, 32 engage with and are secured to each other. This is typical of rotor blades constructed of layers of composite material, and therefore the particular constructions of the rotor blade 14 has not been described in detail.

The preferred embodiment of the segmented trim tab assembly 12 of the invention is constructed of several metallic elements or panels 36, 38, 42, 44. However, in alternate embodiments, the segmented trim tab assembly 12 may be constructed of only one trim tab panel. Because each of the trim tab panels are basically the same in construction, only one of the trim tab panels 38 will be described in detail.

In the preferred embodiment of the invention, the trim tab panel 38 is constructed as a flat, rigid panel of metal. The panel 38 has a longitudinal length between opposite proximal 46 and distal 48 edges, and a lateral width between opposite forward 52 and trailing 54 edges. The metal of the trim tab panel 38 enables portions of the panel to be bent relative to each other and remain in their bent configuration.

Each of the trim tab panels 36, 38, 42, 44 is encapsulated in a flexible material 56, preferably rubber. FIG. 2 shows the relative positions of the trim tab panels 36, 38, 42, 44 on the bottom layer of the flexible material 56 that encapsulates the panels, the top layer of the material being removed. FIG. 4 also shows the relative positions of the trim tab panels 36, 38, 42, 44 encapsulated in the flexible material 56. Each of the trim tab panels 36, 38, 42, 44 is positioned so that the forward edges and rearward edges of the panels are arranged in a straight line. In addition, the trim tab panels 36, 38, 42, 44 are spatially arranged relative to each other with longitudinal spacings between adjacent panels being occupied by portions of the flexible material 56 that encapsulates the panels. As shown in FIGS. 3 and 5, a forward portion 58 of the flexible material 56 adjacent the forward edges of the trim tab panels 36, 38, 42, 44 has a reduced thickness from the rearward portion 62 of the flexible material adjacent the rearward edges of the trim tab panels.

The segmented trim tab assembly 12 is secured to the helicopter rotor blade 14 by the upper layer 26 and lower layer 32 of the rotor blade composite material overlapping the forward portion 58 of the flexible material. This sandwiches the forward portion 58 of the flexible material as well as the forward edges of the trim tab panels 36, 38, 42, 44 inside or between the composite material upper layer 26 and composite material lower layer 32. As best seen in FIG. 5, the reduced thickness forward portion 58 of the flexible material 56 is overlapped by the rotor blade composite material upper layer 26 and lower layer 32 to provide a smooth continuous surface as the rotor blade composite material upper and lower layers 26, 32 transition to the flexible material rearward portion 32.

With the segmented trim tab assembly 12 secured to the rotor blade trailing edge 24, each of the individual trim tab panels 36, 38, 42, 44 can be moved relative to the rotor blade 14 to tune the aerodynamic properties of the rotor blade. The lateral spacing between the trim tab panels 36, 38, 42, 44 occupied by the flexible material 56 enables each of the panels to be moved relative to each other. In addition, the trim tab panels 36, 38, 42, 44 being constructed of metal enables the panels to be set in a desired orientation relative to the rotor blade 14 by being bent upwardly or downwardly relative to the rotor blade. The metal of the trim tab panels 36, 38, 42, 44 holds the panels in their set or bent positions relative to the helicopter rotor blade 14 to aerodynamically tune the rotor blade. Furthermore, by providing the segmented trim tab assembly with several separate trim tab panels 36, 38, 42, 44, each individual panel does not fully experience the global strain level of the rotor blade trailing edge 24 on rotation of the rotor blade. This enables each of the individual trim tab panels 36, 38, 42, 44 to survive the high strain that the composite material rotor blade experiences without premature failure of the panels. In addition, the flexible material 56 that encapsulates the panels 36, 38, 42, 44 provides good aerodynamic surfaces on the opposite sides of the panels.

Although the present invention has been described above by reference to a specific embodiment of the invention, it should be understood that modifications and variations of the invention may be arrived at without departing from the intended scope of protection provided by the following claims.

That which is claimed is:

1. An aircraft rotor comprising:
a rotor blade having a length with opposite top and bottom surfaces, and opposite forward and rearward edges;
at least one trim tab on the rotor blade, the trim tab being a rigid panel having a length that extends along the rotor blade rearward edge, a forward edge that is secured to the rotor blade, and a rearward edge that is spaced outwardly from the rotor blade rearward edge;
the trim tab being one of a plurality of trim tabs on the rotor blade, the plurality of trim tabs being spatially arranged along the length of the rotor blade; and,
the plurality of trim tabs being encapsulated in a flexible material.

2. An aircraft rotor comprising:
a rotor blade having a length with opposite top and bottom surfaces, and opposite forward and rearward edges;
at least one trim tab on the rotor blade, the trim tab being a rigid panel having a length that extends along the rotor blade rearward edge, a forward edge that is secured to the rotor blade, and a rearward edge that is spaced outwardly from the rotor blade rearward edge;
the rotor blade having an upper layer of material and a lower layer of material, the upper layer of material extends across the trim tab forward edge and the lower layer of material extends across the trim tab forward edge with the trim tab forward edge being sandwiched between the rotor blade upper layer of material and lower layer of material; and,
the trim tab being encapsulated in flexible material.

3. An aircraft rotor comprising:
a composite material rotor blade having a length with opposite top and bottom surfaces, and opposite forward and rearward edges;
a metallic trim tab on the rotor blade, the trim tab being a rigid panel having a length that extends along the rotor blade length, a forward edge that is secured to the rotor blade, and a rearward edge that is spaced outwardly from the rotor blade rearward edge; and,
the trim tab being encapsulated in a flexible material.

4. An aircraft rotor comprising:
a rotor blade having a longitudinal length with opposite top and bottom surfaces, and laterally opposite forward and rearward edges;
a plurality of trim tabs on the rotor blade, each of the trim tabs being a rigid panel having a longitudinal length that extends along a portion of the rotor blade length, a forward edge that is secured to the rotor blade and a laterally opposite rearward edge that is spaced outwardly from the rotor blade rearward edge, and the plurality of trim tabs being spatially arranged along the rotor blade length with there being a longitudinal spacing between adjacent trim tabs; and,
each of the plurality of trim tabs being encapsulated in a flexible material.

5. The rotor of claim 4, further comprising:
the flexible material interconnecting the plurality of trim tabs.

6. The rotor of claim 4, further comprising:
the flexible material extending into the longitudinal spacing between adjacent trim tabs.

7. An aircraft rotor comprising:
a rotor blade having a length with opposite top and bottom surfaces, and opposite forward and rearward edges; and,
at least one trim tab on the rotor blade, the trim tab being a rigid panel having a length that extends along the rotor blade rearward edge, a forward edge that is secured to the rotor blade, and a rearward edge that is spaced outwardly from the rotor blade rearward edge;
the trim tab being covered by a flexible material;
the flexible material having a forward portion adjacent the forward edge of the trim tab and a rearward portion adjacent the rearward edge of the trim tab, the forward portion of the flexible material having a reduced thickness from the rearward portion of the flexible material; and,
the rotor blade having an upper layer defining the blade top surface and a lower layer defining the blade bottom surface, the upper layer and lower layer overlapping the forward portion of the flexible material providing smooth surfaces as the upper and lower layers transition to the flexible material rearward portion.

8. The rotor of claim 7, further comprising:
the rotor blade being constructed of a composite material; and,
the trim tab being constructed of a metallic material.

9. The rotor of claim 8, further comprising:
the trim tab being one of a plurality of trim tabs on the rotor blade, the plurality of trim tabs being spatially arranged along the length of the rotor blade.

10. The rotor of claim 7, further comprising:
the upper layer of material extends across the trim tab forward edge and the lower layer of material extends across the trim tab forward edge with the trim tab forward edge being sandwiched between the rotor blade upper layer of material and lower layer of material.

11. The rotor of claim 10, further comprising:
the trim tab being one of a plurality of trim tabs on the rotor blade, the plurality of trim tabs being spatially arranged along the length of the rotor blade with each trim tab having a forward edge that is sandwiched between the rotor blade upper layer of material and lower layer of material.

12. The rotor of claim 11, further comprising:
the plurality of trim tabs being encapsulated in a flexible material.

13. The rotor of claim 7, further comprising:
the flexible material forward portion sandwiches the forward edge of the trim tab rigid panel and the flexible material rearward portion sandwiches the rearward edge of the trim tab rigid panel.

14. An aircraft rotor comprising:
a composite material rotor blade having a length with opposite top and bottom surfaces, and opposite forward and rearward edges;
a metallic trim tab on the rotor blade, the trim tab being a rigid panel having a length that extends along the rotor blade length, a forward edge that is secured to the rotor blade, and a rearward edge that is spaced outwardly from the rotor blade rearward edge; and,
the trim tab being covered by a flexible material;
the flexible material having a forward portion adjacent the forward edge of the trim tab and a rearward portion adjacent the rearward edge of the trim tab, the forward portion of the flexible material having a reduced thickness from the rearward portion of the flexible material; and,
the rotor blade having an upper layer defining the blade top surface and a lower layer defining the blade bottom surface, the upper layer and lower layer overlapping the forward portion of the flexible material providing smooth surfaces as the upper and lower layers transition to the flexible material rearward portion.

15. The rotor of claim 14, further comprising:
the trim tab being one of a plurality of trim tabs on the rotor blade, the plurality of trim tabs being spatially arranged along the rotor blade rearward edge.

16. The rotor of claim 15, further comprising:
the trim tabs being encapsulated in a flexible material.

17. The rotor of claim 14, further comprising:
the rotor blade having an upper layer of composite material and a lower layer of composite material, the upper layer of composite material extends over the trim tab forward edge and the lower layer of composite material extends over the trim tab forward edge with the trim tab forward edge being sandwiched between the rotor blade upper layer of composite material and the rotor blade lower layer of composite material.

18. The rotor of claim 17, further comprising:
the metallic trim tab is encapsulated in a flexible material.

19. The rotor of claim 17, further comprising:
the metallic trim tab is one of a plurality of metallic trim tabs on the rotor blade, the plurality of metallic trim tabs being spatially arranged along the rotor blade length.

20. The rotor of claim 19, further comprising:
each of the plurality of metallic trim tabs is encapsulated in a flexible material.

21. The rotor of claim 14, further comprising:
the metallic trim tab being bendable relative to the rotor blade.

22. The rotor of claim 14, further comprising:
the flexible material forward portion sandwiches the forward edge of the trim tab rigid panel and the flexible material rearward portion sandwiches the rearward edge of the trim tab rigid panel.

23. An aircraft rotor comprising:
a rotor blade having a longitudinal length with opposite top and bottom surfaces, and laterally opposite forward and rearward edges;
a plurality of trim tabs on the rotor blade, each of the trim tabs being a rigid panel having a longitudinal length that extends along a portion of the rotor blade length, a forward edge that is secured to the rotor blade and a laterally opposite rearward edge that is spaced outwardly from the rotor blade rearward edge, and the plurality of trim tabs being spatially arranged along the rotor blade length with there being a longitudinal spacing between adjacent trim tabs;
the trim tab being covered by a flexible material;
the flexible material having a forward portion adjacent the forward edge of the trim tab and a rearward portion adjacent the rearward edge of the trim tab, the forward portion of the flexible material having a reduced thickness from the rearward portion of the flexible material; and,
the rotor blade having an upper layer defining the blade top surface and a lower layer defining the blade bottom surface, the upper layer and lower layer overlapping the forward portion of the flexible material providing smooth surfaces as the upper and lower layers transition to the flexible material rearward portion.

24. The rotor of claim 23, further comprising:

each of the plurality of trim tabs being constructed of a metallic material; and, the rotor blade being constructed of composite material.

25. The rotor of claim 23, further comprising:

the plurality of trim tabs are encapsulated in a flexible material.

26. The rotor of claim 25, further comprising:

the flexible material interconnects the plurality of trim tabs.

27. The rotor of claim 23, further comprising:

each of the plurality of trim tabs being moveable relative to the rotor blade and the other trim tabs.

28. The rotor of claim 23, further comprising:

the flexible material forward portion sandwiches the forward edge of the trim tab rigid panel and the flexible material rearward portion sandwiches the rearward edge of the trim tab rigid panel.

* * * * *